United States Patent
Iketani et al.

(10) Patent No.: US 6,534,167 B1
(45) Date of Patent: Mar. 18, 2003

(54) POLYMER COMPOSITION FOR POWER MOLDING, POWER THEREOF, FOAMED OBJECT, AND PROCESS FOR PRODUCING FOAMED OBJECT

(75) Inventors: Kohichi Iketani, Chiba (JP); Yoshihiro Nakatsuji, Chiba (JP); Kohsuke Ohtani, Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/485,091

(22) PCT Filed: Jun. 1, 1999

(86) PCT No.: PCT/JP99/02901

§ 371 (c)(1),
(2), (4) Date: Mar. 31, 2000

(87) PCT Pub. No.: WO99/62992

PCT Pub. Date: Dec. 9, 1999

(30) Foreign Application Priority Data

Jun. 4, 1998 (JP) ............................................. 10-156225

(51) Int. Cl.⁷ ................................................. B23B 9/00
(52) U.S. Cl. ..................................................... 428/318.4
(58) Field of Search ........................... 428/318.4, 304.4, 428/221, 327

(56) References Cited

U.S. PATENT DOCUMENTS

| | | | |
|---|---|---|---|
| 4,916,165 A | 4/1990 | Hashimoto et al. | ............ 521/96 |
| 5,532,055 A | 7/1996 | Igarashi et al. | .......... 428/318.6 |
| 5,576,080 A | 11/1996 | Sugimoto et al. | .......... 428/36.5 |
| 6,133,193 A | * 10/2000 | Kajikawa et al. | |

FOREIGN PATENT DOCUMENTS

| | | |
|---|---|---|
| EP | 0 323 160 A2 | 7/1989 |
| EP | 0 672 721 A2 | 9/1995 |
| EP | 0 790 279 A2 | 8/1997 |
| JP | 62-215637 | 9/1987 |
| JP | 07-258446 | 10/1995 |
| JP | 11-60772 | 3/1999 |
| JP | 11-147967 | 6/1999 |
| WO | WO 96/06888 | 3/1996 |

* cited by examiner

*Primary Examiner*—Tom Dunn
*Assistant Examiner*—Jonathan Johnson
(74) *Attorney, Agent, or Firm*—Sughrue Mion, PLLC

(57) ABSTRACT

A polymer composition for powder molding, containing (A) to (E) described below: (A) a peroxide-crosslinkable olefin-based copolymer having a melt flow rate measured under the conditions of a load of 2.16 kgf and a temperature of 190° C. according to JIS K7210 of 1 g/10 min. or more; (B) 0.1 to 10 parts by weight of a peroxide having a temperature for obtaining a half life of 10 hours of 100° C. or more, per 100 parts by weight of (A); (C) 0.1 to 7 parts by weight of a crosslinking aid per 100 parts by weight of (A); (D) 0.1 to 20 parts by weight of a thermal decomposition type foaming agent per 100 parts by weight of (A); and (E) 0.1 to 10 parts by weight of a foaming aid per 100 parts by weight of (A), a powder and foamed article of the polymer composition, a method for producing the foamed article, and a molded article containing the foamed article, and further the polymer composition is excellent in the storage stability of its uncrosslinked composition, and can provide a foamed article having a high expansion ratio and an excellent surface skin, and hardly having a skin lack of hiding.

5 Claims, No Drawings

POLYMER COMPOSITION FOR POWER MOLDING, POWER THEREOF, FOAMED OBJECT, AND PROCESS FOR PRODUCING FOAMED OBJECT

TECHNICAL FIELD

The present invention relates to a polymer composition for powder molding and a powder, a foamed article obtained by using said polymer composition, a producing method of the foamed article and a molded article. More specifically, the present invention relates to a polymer composition for powder molding containing a peroxide-crosslinkable olefin-based copolymer as a polymer component, wherein the composition is excellent in the storage stability of an uncrosslinked article and provides a foamed article having a high expansion ratio, an excellent heat stability and elasticity and an excellent surface skin and hardly having a skin lack of hiding and a powder of said polymer composition, a foamed article, a method for producing said foamed article, and a molded article containing said foamed article.

BACKGROUND ARTS

Interior parts such as an instrument panel, a headrest, an armrest, a door trim and the like of an automobile have had a remarkable tendency to be a soft type from a conventional hard type. These parts are constituted by multi-layers composed of a skin layer with embossing, a foamed layer as a cushion layer and a base material layer.

Hitherto, a method of separately making a skin layer and a base material layer, then inserting them into a mold, injecting an urethane between the skin layer and the base material layer, and foaming it to integrate, has been applied as a method for obtaining such multi-layer parts. In this case, the skin layer is prepared by a slush molding using a vinyl chloride resin powder, and the base material layer is prepared by an injection molding using a polyolefin (e.g. polypropylene, polyethylene), an ABS resin (an acrylonitrile-butadiene-styrene copolymer) or the like. In case of applying production method composed of such three steps, there is a problem that its cost is high.

According to the investigation by the present inventors, a multi-layer molded article can be obtained by two steps of laminating a resin of the base material layer on the surface of a foamed layer by means of a press molding, injection molding, adhesion or the like after a two-layer molded article of a skin layer and a foamed layer is obtained. When the skin layer and the base material layer are laminated, it is required that the surface of the foamed layer is smooth.

In order to obtain a two-layer molded article by a powder slush molding, for example, the two-layer molded article composed of a non-foamed skin layer and a foamed layer is formed by heating a mold which may have a complicated pattern on a molding face above a melting temperature of a resin powder for the skin layer, then feeding the above-mentioned resin powder for the skin layer on the molding face of said mold, removing an extra powder which did not melt after obtaining an sheet-like melted article on said molding face by mutually heat-fusing the powders, successively feeding a peroxide-crosslinkable and expandable olefin-based resin composition powder (hereinafter, referred to as "powder for crosslinking-foaming") on the sheet-like melted article, removing the extra powder which did not melt after obtaining the sheet-like melted article on said molding face by heat-fusing the powders each other, then further heating it thereby crosslinking and foaming, and cooling the mold.

The powder for crosslinking-foaming used in such step is subject to a remarkable thermal history since the feed of the powder on a heat melted resin and the removal of said unmelted powder therefrom are repeatedly carried out. Further, when the powder for crosslinking-foaming is stored for a long time in a hot period of summer till using it from preparation, the powder is also subject to a remarkable thermal history. When the powder for crosslinking-foaming containing a crosslinking agent induces an early crosslinking (hereinafter, referred to as "scorch") according to such thermal history, the melt flow property of the powder becomes poor, and a foamed article having a smooth surface skin can not be obtained, therefore the storage stability of the powder for crosslinking-foaming is an important subject.

Further, when a balance between the crosslinking rate of the powder for crosslinking-foaming and the decomposition rate of a foaming agent is broken, a gas is stored in an interface between the skin layer of non-crosslinked layer and the foamed layer, and accordingly, the skin layer becomes partially thin and a phenomena in which the part of foamed layer is seen through (hereinafter, referred to as "skin lack of hiding") occurs. When a molded article of two-layer structure is obtained by a powder slush molding, a powder composition for foaming excellent in the storage stability of an uncrosslinked powder and further providing a molded article having no skin lack of hiding and a smooth surface skin of the foamed layer, has not been found yet.

As a method for obtaining a foamed molded article, for example, a method for obtaining a foamed molded article by adding a foaming agent to a partially crosslinked matter of a composition of an ethylene-α-olefin copolymer rubber and a polyolefin-based resin, is disclosed (Japanese Patent Publication (Kokai) Hei No. 4-345637). Although this process has characteristics that a foamed article having a high expansion ratio, homogeneous cells and the like, can be obtained, a melt flow property is remarkably inferior, and therefore, a powder slush molding cannot be adopted.

Further, a method for obtaining a foamed article by adding a carboxylic acid having 2 or more of carboxyl groups and a thermal decomposition type foaming agent to an ethylene-based copolymer containing a glycidyl group, is disclosed (Japanese Patent Publication (Kokai) Hei No. 7-228720). However, although the method is superior in the surface skin of the foamed article obtained and the homogeneity of cells, the composition used in the method induces a scorch during a short time storage, and therefore has a problem that the storage stability is remarkably inferior.

DISCLOSURE OF THE INVENTION

Under these circumstances, the subject to be solved by the present invention is to provide a polymer composition for powder molding containing a peroxide-crosslinkable olefin-based copolymer as a polymer component, a polymer composition for powder molding having an excellent storage stability of an uncrosslinked powder and being capable of providing a foamed article having homogeneous cells and an excellent surface skin, and hardly having a skin lack of hiding, a powder of said polymer composition, a foamed article, a method for producing said foamed article, and a molded article.

The present invention relates to a polymer composition for powder molding containing (A)–(E) described below:

(A) a peroxide-crosslinkable olefin-based copolymer having a melt flow rate measured under the conditions of a load of 2.16 kgf and a temperature of 190° C. according to JIS K7210 of 1 g/10 min. or more;

(B) 0.01 to 10 parts by weight of a peroxide having a temperature for obtaining a half life of 10 hours of 100° C. or more, per 100 parts by weight of (A);

(C) 0.1 to 7 parts by weight of a crosslinking aid per 100 parts by weight of (A);

(D) 0.1 to 20 parts by weight of a thermal decomposition type foaming agent per 100 parts by weight of (A); and (E) 0.1 to 10 parts by weight of a foaming aid per 100 parts by weight of (A).

Further, the present invention relates to a powder prepared from the above-mentioned polymer composition, a method for producing a foamed article comprising crosslinking-foaming said powder, and a molded article obtained by the method.

Moreover, the present invention relates to a two-layer molded article obtained by laminating a non-foamed layer composed of a thermoplastic elastomer or vinyl chloride-based resin composition on a foamed layer composed of the above-mentioned foamed article, a multi-layer molded article obtained by laminating a reinforcing layer composed of a thermoplastic resin composition or a thermoplastic elastomer composition on the foamed layer side of said two-layer molded article, and further, a multi-layer molded article obtained by further laminating a base material layer on the two-layer molded article or multi-layer molded article.

BEST MODE FOR PRACTICING THE INVENTION

The polymer (A) used in the present invention is a peroxide-crosslinkable olefin-based polymer having a melt flow rate measured under the conditions of a load of 2.16 kgf and a temperature of 190° C. according to JIS K7210 of 1 g/10 min. or more. The peroxide-crosslinkable olefin-based polymer means an olefin-based polymer whose flowability is deteriorated or lost because of a crosslinking by being mixed with a peroxide and heated.

Examples of the peroxide-crosslinkable olefin-based polymer (A) used in the present invention include a low density polyethylene, a high density polyethylene and an ethylene-based copolymer. The comonomer in the ethylene-based copolymer includes α-olefins (preferably α-olefins having 3 to 12 carbon atoms), ethylenically α, β-unsaturated carboxylic acids, alkyl esters having 1 to 12 carbon atoms of ethylenically α, β-unsaturated carboxylic acids, vinyl esters of carboxylic acids, vinyl ketones, polymerizable epoxy group-containing compounds (for example, glycidyl esters of ethylenically α, β-unsaturated carboxylic acids) and the like. Specific examples of the ethylene copolymer include ethylene-α-olefin copolymers such as an ethylene-propylene copolymer, an ethylene-butene-1 copolymer and the like, ethylene-vinyl acetate-based copolymers such as an ethylene-vinyl acetate copolymer, an ethylene-vinyl acetate-maleic anhydride copolymer, an ethylene-vinyl acetate-acrylate copolymer or the like, ethylene-ethylenically α, β-unsaturated carboxylic acid copolymers such as an ethylene-acrylic acid copolymer and the like, ethylene-alkyl ester of ethylenically, α, β-unsaturated carboxylic acid copolymers such as an ethylene-methyl acrylate copolymer, an ethylene-ethyl acrylate copolymer, an ethylene-methyl methacrylate copolymer, an ethylene-ethyl methacrylate copolymer and the like, epoxy group-containing ethylene copolymers such as an ethylene-glycidyl methacrylate copolymer, an ethylene-vinyl acetate-glycidyl methacrylate copolymer and the like, etc., and these are used alone or as a blend of two kinds or more.

The melt flow rate of the peroxide-crosslinkable olefin-based polymer (A) measured under the conditions of a load of 2.16 kgf and a temperature of 190° C. according to JIS K7210 is 1 g/10 min. or more. When the melt flow rate is too low, a powder moldability is inferior, and a good foamed article cannot be obtained. It is preferably a range of 5 to 450 g/10 min.

The above-mentioned peroxide-crosslinkable olefin-based polymer (A) can be obtained by a known method such as a solution polymerization, emulsion polymerization, suspension polymerization, slurry polymerization, gas phase polymerization or the like.

In the present invention, it is required to use a peroxide (B) having a temperature for obtaining a half life of 10 hours of 100° C. or more, as a crosslinking agent. When the temperature for obtaining a half life of 10 hours is less than 100° C., there occur problems that the storage stability is inferior and an expansion ratio is not increased in addition to the processability that a skin lack of hiding occurs and the like.

Specific examples of the peroxide (B) having a temperature for obtaining a half life of 10 hours of 100° C. or more, include 2,5-dimethyl-2,5-di(benzoylperoxy)hexane, 2,5-bis(tert-butylperoxy)octane, tert-butylperoxyacetate, 2,2-bis(tert-butyl peroxy)butane, tert-butyl peroxybenzoate, n-butyl-4,4-bis(tert-butyl peroxy)valerate, di-tert-butyl diperoxyisophthalate, methyl ethyl ketone peroxide, dicumyl peroxide, 2,5-dimethyl-2,5-di(tert-butyl peroxy)hexane, α, α'-bis(tert-butyl peroxy-m-isopropyl)benzene, tert-butylcumyl peroxide, diisopropylbenzene hydroperoxide, di-tert-butyl peroxide, p-menthane hydroperoxide, 2,2-dimethyl-2,5-di(tert-butyl peroxy)hexyne-3, 1,1,3,3-tetramethylbutyl hydroperoxide, 2,5-dimethylhexane-2,5-hydroperoxide, cumene hydroperoxide, tert-butyl hydroperoxide and the like. These are used alone or in combination of two kinds or more. Among them, α, α'-bis(tert-butyl peroxy-m-isopropyl)benzene and 2,5-di(tert-butyl peroxy)hexane are preferable.

The compounding amount of the peroxide (B) having a temperature for obtaining a half life of 10 hours of 100° C. or more, is 0.1 to 10 parts by weight per 100 parts by weight of the peroxide-crosslinkable olefin-based polymer (A), and preferably 0.3 to 7 parts by weight. When the compounding amount of the peroxide (B) having a temperature for obtaining a half life of 10 hours of 100° C. or more, is too small, the heat resistance and elasticity of the foamed article are deteriorated because the crosslinking density is too low. On the other hand, when the compounding amount of the peroxide (B) having a temperature for obtaining a half life of 10 hours of 100° C. or more, is too large, there occur problems that the expansion ratio is not increased because the crosslinking density is too high, the storage stability of uncrosslinked powder is deteriorated, and cost is increased, etc.

As the crosslinking aid (C) used in the present invention, known aides can be used. Specific examples of the crosslinking aid (C) include triallyl isocyanurate, ethyleneglycol dimethacrylate, diethyleneglycol dimethacrylate, N,N'-m-phenylene bismaleimide, polyethyleneglycol dimethacrylate, trimethylolpropane trimethacrylate, allyl methacrylate, nitrobenzene, p-quinonedioxime, p,p'-dibenzoyl quinonedioxime and the like. These are used alone or in combination of two kinds or more. Among them, triallyl isocyanurate and ethyleneglycol dimethacrylate are preferable.

The amount of the crosslinking aid (C) in the polymer composition in the present invention is 0.1 to 7 parts by weight per 100 parts by weight of the peroxide crosslinkable olefin-based polymer (A), and preferably 0.3 to 5 parts by weight. When the amount of the crosslinking aid (C) is too small, the heat resistance and elasticity of the foamed article are deteriorated because the crosslinking density is too low. On the other hand, when the amount of the crosslinking aid (C) is too large, there occur problems that the expansion ratio is not increased and further, the storage stability of uncrosslinked powder is deteriorated, etc. because the crosslinking reaction excessively proceeds.

As the thermal decomposition type foaming agent (D) used in the present invention, a foaming agent having a decomposition temperature of 120 to 230° C., is preferable. Specific examples satisfying this condition include azodicarbonamide, 2,2'-azobisisobutylonitrile, diazodiaminobenzene, benzenesulfonylhydrazide, benzene-1,3-sulfonylhydrazide, diphenylsulfone-3,3'-disulfonylhydrazide, diphenyloxido-4,4,'-disulfonylhydrazide, 4,4'-oxybis(benzenesulfonylhydrazide)-p-toluenesulfonylhydrazide, N,N'-nitrosopentamethylenetetramine, sodium bicarbonate and the like. Among them, azodicarbonamide is preferably used.

The amount of the thermal decomposition type foaming agent (D) used in the present invention is 0.1 to 20 parts by weight per 100 parts by weight of the peroxide-crosslinkable olefin-based polymer (A), and preferably 0.3 to 13 parts by weight. When the amount of the thermal decomposition type foaming agent (D) is too small, a problem occurs in softness as a cushion material because the expansion ratio is low. On the other hand, when the amount of the thermal decomposition type foaming agent (D) is too large, there occur problems that the surface skin of a foamed article is deteriorated and a crack is generated in the foamed article to be damaged, etc.

Specific examples of the foaming aid (E) used in the present invention include zinc stearate, calcium stearate, stearic acid, urea-based auxiliaries, triethanolamine, zinc white, zinc carbonate, titanium white, carbon black and the like.

The amount of the foaming aid (E) in the polymer composition of the present invention is 0.1 to 10 parts by weight per 100 parts by weight of the peroxide crosslinkable olefin-based polymer (A), and preferably 0.2 to 7 parts by weight. When the amount of the foaming aid (E) is too small, the expansion ratio is low, and on the other hand, when the amount of the foaming aid (E) is too large, there occur problems that the cells of a foamed article become rough and the surface skin is deteriorated, etc. Further, the amount of the foaming aid (E) is preferably the amount of the thermal decomposition type foaming agent (D) or less.

The polymer composition of the present invention is widely used for the use of a powder foaming molding such as a powder slush molding, a rotational molding, a spray molding, an electrodeposition molding, or the like, and among them, is suitably used for the use of a powder slush foaming molding.

The powder prepared from the polymer composition of the present invention used for the use of a powder foaming molding is preferably a sphere-reduced average particle diameter of 50 to 1200 $\mu$m, and more preferably 75 to 850 $\mu$m. When said particle diameter is too small, powder separating property is sometimes deteriorated, and the surface skin sometimes becomes inferior. On the other hand, when said particle diameter is too large, the heat fusion of mutual pellets is insufficient during the powder slush molding, and the surface skin of the foamed article obtained sometimes becomes inferior. Further, the sphere-reduced average particle diameter is a particle diameter determined by measuring an average volume of the powder and then calculating a diameter of a sphere which has the same volume as the mean volume. Wherein the average volume of particles is a value calculated from the total weight of 100 particles of a powder for a crosslinking-foaming, randomly collected and the density of a powder composition for a crosslinking-foaming.

The foamed article is obtained by crosslinking and foaming the powder of the present invention by a known method. As the process for the crosslinking-foaming, for example, a method of carrying out the crosslinking-foaming by a slush molding can be mentioned.

A two-layer molded article in which a non-foamed layer made of a thermoplastic elastomer composition or a vinyl chloride-based resin composition is laminated on the foamed layer prepared from said foamed article can be obtained using the foamed article of the present invention.

Further, a multi-layer molded article in which a reinforcing layer made of a thermoplastic resin composition or a thermoplastic elastomer composition is laminated on the foamed layer side of the above-mentioned two-layer molded article, can be obtained. As there is a case of breaking the foamed layer when a base material layer is laminated at the post step, the reinforcing layer is optionally molded in order to protect it.

Further, a multi-layer molded article in which a base material layer made of a thermoplastic resin composition is laminated on the foamed layer side of the above-mentioned two-layer molded article, can be obtained.

Further, a multi-layer molded article in which a base material layer made of a thermoplastic resin composition is laminated on the reinforcing layer of the above-mentioned multi-layer molded article, can be obtained. Wherein, the thermoplastic resin as the base material layer of a thermoplastic resin is not specifically limited, and a thermoplastic resin such as a polyolefin such as polypropylene, polyethylene or the like; an ABS resin (acrylonitrile-butadiene-styrene copolymer) or the like is used. Among them, a polyolefin such as polypropylene or the like is preferably used. As the thermoplastic resin of the reinforcing layer, the similar material as the base material layer is also used, and further, a known thermoplastic elastomer can be also used.

In the composition of the present invention, additives such as reinforcing agents, fillers, plasticizers, antioxidants, stabilizers, ultraviolet-ray absorbers, processing auxiliaries, releasing agents and the like which are used in a usual resin industry, a rubber industry or the like, may be added to the peroxide-crosslinkable olefin-based copolymer so far as the object of the present invention is not damaged.

The composition of the present invention is granulated to pellets with an extruder after mixing with a usual kneading machine such as an extruder, a Banbury mixer, a kneader or the like. When the particle diameter is about 50 to about 1200 $\mu$m, the powder can be used for the powder slush molding as it is. When the particle diameter exceeds 1200 $\mu$m, the powder is used by pulverizing with a freeze pulverizer thereby to adjust the sphere-reduced average diameter within the above-mentioned range.

In order to obtain the two-layer molded article according to the powder slush molding method, the two-layer molded article constituted by non-foaming skin layer and the foamed layer is obtained, for example, by preheating a mold which may optionally have a complicated pattern on its molding face (the temperature is usually 170 to 280° C. and the melting point or more of the resin powder for a skin layer), feeding the above-mentioned resin powder for a skin layer on the molding face of said mold, mutually thermal-fusing the powders to form a sheet-like fused article on said molding face and then remove extra powders which were not thermal-fused, then feeding the composition powder (the powder for the crosslinking-foaming) on the sheet-like fused article, mutually thermal-fusing the powders to obtain a sheet-like fused article on said molding face and then remove extra powders which were not thermal-fused, successively further carrying out the crosslinking-foaming in a heating furnace (the temperature is usually 160 to 260° C. and the time is 15 seconds to 5 minutes), then taking it out from the heating furnace and cooling the mold.

The production of the multi-layer molded article according to the powder slush molding method is carried out in accordance with the method of preparing the above-mentioned two-layer molded article. The multi-layer molded article constituted by a non-foamed skin layer, a foamed layer and a reinforcing layer for protection of said foamed layer is obtained by forming a fused layer fusing the powder composition of the present invention (the powder for the crosslinking-foaming) on the skin layer, then feeding the thermoplastic resin powder on the surface as the reinforced layer, mutually thermal-fusing the powders to form a sheet-like fused article on said molding surface and then remove extra powders which were not thermal-fused, successively further carrying out the crosslinking-foaming in a heating furnace (the temperature is usually 160 to 260° C. and the time is 15 seconds to 5 minutes.), then taking it out from the heating furnace and cooling the mold.

Since the powder composition of the present invention has characteristics that when the two-layer molded article constituted by the non-foamed skin layer and the foamed layer is obtained according to the powder slush molding method, it is excellent in the storage stability of an uncrosslinked article and in the surface skin of the obtained foamed article, and there is no problem of occurrence of skin lack of hiding, and the like, it is possible to keep a good feeling after laminating the base material layer. Further, since a foamed article having sufficient properties even under crosslinking-foaming conditions of a low temperature and a short time is obtained, it is possible to reduce its cost and improve its productivity. Accordingly, it can be widely used for uses for various cushion materials of an automobile, a building, a general industrial use or the like, and specifically an instrument panel, a headrest, a console box, an armrest, a door trim, and the like of an automobile.

The present invention is specifically illustrated according to Examples below, but the present invention is not limited to these Examples.

EXAMPLE

Examples 1 to 7 and Comparative Examples 1 to 4

Preparation of Composition and Molded Article

Polymers shown in Tables 1 and 2 and various additives of quantities shown in said Tables were charged in a Laboratory Plastomill (an inner volume of 100 ml) manufactured by Toyo Seiki Co., Ltd., and the mixture was kneaded under conditions of a temperature of 105° C., a rotational number of 50 rpm, a kneading time of 5 minutes and a charge ratio of 80% to prepare compositions.
[Preparation of Composition Powder]

After each of the above-kneaded compositions was pressed to prepare a sheet-like article during being hot, it was cut down into a die shape of about 5 mm square with scissors. After the cut samples were immersed in liquid nitrogen for about 5 minutes, they were charged to a laboratory freezing pulverizer to obtain a powder of a sphere-reduced average particle diameter of 350 μm.
[Preparation of Two-layer Molded Article According to Powder Slush Molding]

After a mold embossed with 150 mm square was preheated to 260° C., the resin powder for skin layer was fed while heaping up, and the extra powder which was not heat-fused was removed after standing alone for 15 seconds, and kept for 30 seconds. Then, the powder for crosslinking-foaming was charged on the sheet-like fused article, the extra powder for crosslinking-foaming which was not heat-fused was removed after standing alone for 20 seconds, and the crosslinking-foaming was immediately carried out for 2 minutes in a gear-oven kept at 220° C. The mold taken out from the gear-oven was cooled with water to obtain a two-layer molded article composed of a non-foamed skin layer and a foamed layer.

Evaluations of Composition Powder and Molded Article

[Melt Viscosity (Poise)]

The composition obtained by kneading with a Laboratory Plastomill was charged in a mold having a size of 2 mm in thickness×50 mm×50 mm, pressed for 3 minutes with a press kept at 110° C, and then, cooled with water for 3 minutes to prepare a sheet. The sheet was punched out into a disc shape with a diameter of 22 mm, and the viscosity at 125° C. was measured for 30 minutes using a Dynamic Analyzer manufactured by Rheometrix Co., Ltd.

In case of a compounded article inferior in storage stability, the viscosity increases for a short time. On the contrary, in case of a compounded article superior in the storage stability, the increase rate of the viscosity is slow. The minimum value of the viscosity (poise) for 30 minutes was referred to as a melt viscosity.
[Scorch Rate]

The gradient of a change with passage of time of the above-mentioned viscosity is shown. Namely, it is calculated from the following equation.

$$\text{Scorch rate=viscosity(poise)/time(minute)}$$

Measurement Conditions:
  Temperature; 125° C.,
  Plate; a parallel plate is used. Strain; 5%,
  Rate; 1 (radian/sec.)
[Expansion Ratio]

The skin layer of the above-mentioned two-layer molded article was pealed off with a cutter knife and only the foamed layer was used as a sample, and densities before and after foaming were measured to determine the expansion ratio according to the following equation. Each of the densities was measured with an Automatic Densimeter manufactured by Toyo Seiki Seisakusho Co., Ltd.

$$\text{Expansion ratio=density before foaming/density after foaming}$$

[Surface Skin of Foamed Article]

Superiority or inferiority was visually judged for the condition of the surface skin of foamed article side of the two-layer molded article obtained by the fore-mentioned powder slush molding. When the unevenness of surface skin is remarkable, it was judged as unusable because the unevenness is transcribed on the skin side at lamination of the reinforced layer.

Surface skin is excellent and it is practically usable. - - - ○

Slight unevenness is observed on surface but it is practically usable. - - - ○Δ

Unevenness is observed on surface and it is practically unusable. - - - Δ

Unevenness is remarkably observed on surface and it is unusable. - - - X

[Skin Lack of Hiding]

Skin lack of hiding was judged as a measure of the adherence of interface between the foamed article and the black skin layer of the two-layer molded article obtained by the fore-mentioned powder slush molding. When large cells are generated on the interface, the part of the skin layer becomes extremely thin and the adherence of the interface becomes poor. Further, when the skin layer becomes partially thin, it is becomes poor in viewpoint of design and unusable for practical uses. Accordingly, the interface is preferably a foamed layer of micro cells. When the foamed layer side is faced to a fluorescent lamp and observed from the black skin layer side, the points where the skin is thin is seemed to be bright when there is a skin lack of hiding, and therefore, the adherence of interface can be judged. It was judged by the four stages described below.

There is no skin lack of hiding and it is practically usable. - - - ○

Slight skin lack of hiding is observed but it is practically usable. - - - ○Δ

There is a skin lack of hiding and it is practically unusable. - - - Δ

There is a remarkable skin lack of hiding and it is practically unusable. - - - X

[Storage Stability]

The powders for crosslinking-foaming were mounted in a constant temperature oven kept at 23° C., 40° C. or 55° C., respectively and the change with the passage of time of moldability of each of the powder was investigated. One which was slush molded on the next day after preparation of the powder for crosslinking-foaming was referred to as an original, and the superiority or inferiority of surface skin of the foamed layer molded using the powder for crosslinking-foaming which was heat-treated was compared with the surface skin of the foamed layer as the original. Those whose storage stability is inferior by primitively crosslinking during storage are deteriorated in flowability and inferior in the surface skin of the foamed layer.

It was judged by the four stages described below.

It is very excellent in surface skin and usable. - - - ○

It is excellent in surface skin and practically usable. - - - ○Δ

It is inferior in surface skin and practically unusable. - - - Δ

It is remarkably inferior in surface skin and unusable. - - - X

Further, those described below were used as the peroxide-crosslinkable olefin-based polymer in Tables(either of the ratio's are weight ratio).

Copolymer-1: ethylene/vinyl acetate/glycidyl methacrylate=83/5/12, MFR=208 g/10 min.

Copolymer-2: ethylene/vinyl acetate/glycidyl methacrylate=88/5/7, MFR=70 g/10 min.

Copolymer-3: ethylene/vinyl acetate=78/22, MFR=20 g/10 min.

Copolymer-4: ethylene/vinyl acetate=89/11, MFR=0.7 g/10 min.

As the peroxides in Tables, those described below were used. The value parenthesized shows a temperature for obtaining a half life of 10 hours.

Perhexa V40: n-butyl-4,4-bis(tert-butyl peroxy)valerate (105° C.)

Peroxymon F40: α, α'-bis(tert-butyl peroxy-m-isopropyl) benzene (119° C.)

Perhexa 25B40: 2,5-dimethyl-2,5-di(tert-butyl peroxy) hexane (118° C.)

Perhexyne 25B40: 2,5-dimethyl-2,5-di(tert-butyl peroxy) hexyne-3 (135° C.)

Perhexa 3M40: 1,1-bis(tert-butyl peroxy)-3,3,5-trimethylcyclohexane (90° C.)

Niper B: benzoyl peroxide (74° C.)

[Consideration of Results]

All Examples satisfying the conditions of the present invention show results satisfying all of the evaluation items. On the other hand, Comparative Examples 1, 2 and 3 which are out of the scope of the present invention are inferior in the surface skin of foamed article, the skin lack of hiding, the storage stability and the like because they use peroxides whose temperature for obtaining a half life of 10 hours is 100° C. or less. Although Comparative Example 4 uses a peroxide whose temperature for obtaining a half life of 10 hours is 100° C. or more, the slush moldability was inferior because the melt flow rate of a copolymer is small, and a good foamed article was not obtained.

TABLE 1

|  | Example | | | | | | |
| --- | --- | --- | --- | --- | --- | --- | --- |
|  | 1 | 2 | 3 | 4 | 5 | 6 | 7 |
| Copolymer-1 | 100 | 100 | 100 | 100 | 100 |  |  |
| Copolymer-2 |  |  |  |  |  | 100 |  |
| Copolymer-3 |  |  |  |  |  |  | 100 |
| Copolymer-4 |  |  |  |  |  |  |  |
| Perhexa V40 | 3 |  |  |  |  |  |  |
| Peroxymon F40 |  | 3 |  |  | 6 |  | 3 |
| Perhexa 25B40 |  |  | 3 |  |  | 3 |  |
| Perhexyne 25B40 |  |  |  | 3 |  |  |  |
| Perhexa 3M40 |  |  |  |  |  |  |  |
| Niper-B |  |  |  |  |  |  |  |
| TAIC-M60 | 1 | 1 | 1 | 1 | 2 | 1 | 1 |
| Celmike C121 | 3 | 3 | 3 | 3 | 3 | 3 | 3 |
| Zinc white | 2 |  |  |  | 2 |  |  |

TABLE 1-continued

|  | Example | | | | | | |
|---|---|---|---|---|---|---|---|
|  | 1 | 2 | 3 | 4 | 5 | 6 | 7 |
| Naugard 445 | 0.2 | 0.2 | 0.2 | 0.2 | 0.2 | 0.2 | 0.2 |
| Temperature for obtaining half life of 10 hours (° C.) | 105 | 113 | 117 | 134 | 113 | 117 | 117 |
| Melt viscosity (poise) | 5600 | 5300 | 5400 | 5500 | 5800 | 11000 | 21300 |
| Scorch rate | 0.26 | 0.06 | 0.04 | 0.03 | 0.11 | 0.04 | 0.09 |
| Expansion ratio of foamed article | 3.9 | 4.5 | 4.7 | 5.1 | 4.3 | 4.1 | 4.8 |
| Surface skin of foamed article | ○ | ○ | ○ | ○Δ | ○ | ○ | ○Δ |
| Skin lack of hiding | ○Δ | ○ | ○ | ○ | ○ | ○ | ○ |
| Evaluation of storage stability | | | | | | | |
| 23° C. × 7 days | ○ | ○ | ○ | ○ | ○ | ○ | ○Δ |
| 23° C. × 14 days | ○ | ○ | ○ | ○ | ○ | ○ | ○Δ |
| 23° C. × 29 days | ○Δ | ○ | ○ | ○ | ○ | ○ | ○Δ |

TABLE 2

|  | Comparative Example | | | |
|---|---|---|---|---|
|  | 1 | 2 | 3 | 4 |
| Copolymer-1 | 100 | 100 | 100 | |
| Copolymer-2 | | | | |
| Copolymer-3 | | | | |
| Copolymer-4 | | | | 100 |
| Perhexa V40 | | | | |
| Peroxymon F40 | | | | 3 |
| Perhexa 25B40 | | | | |
| Perhexyne 25B40 | | | | |
| Perhexa 3M40 | 3 | 3 | | |
| Niper B | | | 1 | |
| TAIC-M60 | 1 | | | 1 |
| Celmike C121 | 3 | 3 | 3 | 3 |
| Zinc white | | | | 2 |
| Naugard 445 | 0.2 | 0.2 | 0.2 | 0.2 |
| Temperature for Obtaining half life of 10 hours (° C.) | 89 | — | 74 | |
| Melt viscosity (poise) | 7400 | 7200 | 12000 | 28100 |
| Scorch rate | 1.53 | 1.42 | 1.72 | 0.11 |
| Expansion ratio of foamed article | 2.8 | 3.2 | 2.3 | 3.8 |
| Surface skin of foamed article | ○ | ○ | Δ | x |
| Skin lack of hiding | x | Δx | x | Δ |

TAIC-M60: triallylisocyanurate manufactured by Nippon Kasei Co.,Ltd.
Naugard ® 445: antioxidant manufactured by Uniroyal Co., Ltd. Celmike ® C121: azodicarbonamide; foaming agent, manufactured by Sankyo Kasei Co., Ltd.

INDUSTRIAL APPLICABILITY

As illustrated above, according to the present invention, a polymer composition for powder molding containing a peroxide crosslinkable olefin copolymer as a polymer component, wherein the composition is excellent in the storage stability of an uncrosslinked article, the cells of a foamed article obtained is uniform, and a surface skin and a skin lack of hiding are superior; and a powder using said polymer composition, a foamed article, a method for producing said foamed article, a two-layer molded article and a multi-layer molded article can be provided.

What is claimed is:

1. A powder having a sphere-reduced average particle diameter of 50 to 200 μm, for powder molding, comprising (A) to (E) described below:

(A) a peroxide-crosslinkable olefin-based polymer having a melt flow rate measured under the conditions of a load of 2.16 kgf and a temperature of 190° C. according to JIS K7210 of 1 g/10 min. or more, selected from the group consisting of low density polyethylene, high density polyethylene, and an ethylene-based copolymer, wherein a comonomer in the ethylene-based copolymer is selected from the group consisting of an α-olefin having 3–12 carbon atoms, an ethylenically αβunsaturated carboxylic acid, an ester of an alkyl having 1 to 12 carbon atoms of an ethylenically α, β-unsaturated carboxylic acid, a carboxylic acid vinyl ester, a vinyl ketone, and a glycidyl ester of an ethylenically α, β-unsaturated carboxylic acid;

(B) 0.1 to 10 parts by weight of a peroxide having a temperature for obtaining a half life of 10 hours of 100° C. or more, per 100 parts by weight of (A);

(C) 0.1 to 7 parts by weight of a crosslinking aid per 100 parts by weight of (A);

(D) 0.1 to 20 parts by weight of thermal decomposition type foaming agent per 100 parts by weight of (A); and (E) 0.1 to 10 parts by weight of a foaming aid per 100 parts by weight of (A).

2. The powder according to claim 1, wherein the peroxide-crosslinkable olefin-based polymer is an ethylene-vinyl acetate-based copolymer.

3. The powder according to claim 2, wherein the peroxide-crosslinkable olefin-based polymer is a member selected from the group consisting of an ethylene-vinyl acetate copolymer, ethylene-vinyl acetate-maleic anhydride copolymer, and ethylene-vinyl acetate-acrylate copolymer.

4. The powder according to claim 1, wherein the peroxide-crosslinkable olefin-based polymer is an epoxy group-containing ethylene copolymer.

5. The powder according to claim 4, wherein the peroxide-crosslinkable olefin-based polymer is a member selected from the group consisting of an ethylene-glycidyl methacrylate copolymer, and ethylene-vinyl acetate-glycidyl methacrylate copolymer.

* * * * *